United States Patent [19]

Hahn et al.

[11] Patent Number: 5,244,964
[45] Date of Patent: Sep. 14, 1993

[54] PAPER COATING COMPOSITION

[75] Inventors: Karl Hahn, Marl; Hans-Peter Schwengers; Edgar Brehmer, both of Dorsten; Willi Grüber, Haltern, all of Fed. Rep. of Germany

[73] Assignee: Huels Aktiengesellschaft, Marl, Fed. Rep. of Germany

[21] Appl. No.: 972,422

[22] Filed: Nov. 4, 1992

[30] Foreign Application Priority Data

Jan. 2, 1992 [DE] Fed. Rep. of Germany ....... 4200017

[51] Int. Cl.$^5$ .............................................. C08L 39/00
[52] U.S. Cl. ..................................... 524/555; 524/812
[58] Field of Search ................... 524/555, 812

[56] References Cited

U.S. PATENT DOCUMENTS

4,997,877  3/1991  Craig .............................. 524/812 X

FOREIGN PATENT DOCUMENTS

0118252  9/1984  European Pat. Off. ............ 524/812

Primary Examiner—Joseph L. Schofer
Assistant Examiner—J. M. Reddick
Attorney, Agent, or Firm—Oblon, Spivak, McClelland, Maier & Neustadt

[57] ABSTRACT

A paper coating composition consisting essentially of an aqueous plastic dispersion which is based on α-methyleneglutaronitrile, a $C_8$- to $C_{12}$- monovinylaromatic compound, a plasticizing component selected from the group consisting of $C_4$- to $C_6$ acyclic, conjugated diolefines and $C_4$- to $C_8$- alkyl (meth)acrylates, and a $C_3$- to $C_6$ α, β-monoethylenically unsaturated carboxylic acid as binder, and conventional auxiliaries.

6 Claims, No Drawings

PAPER COATING COMPOSITION

BACKGROUND OF THE INVENTION

1. Field of the Invention

The present invention relates to a paper coating composition.

2. Description of the Background

Paper coating compositions are described in U.S. Pat. No. 3,392,048 and EP Published Specification 0 204 550. The binders used in these coating compositions are preferably plastic dispersions based on styrene, 1,3-butadiene, acrylonitrile and an $\alpha,\beta$-monoethylenically unsaturated carboxylic acid. Paper coating compositions containing these binders do not always meet the desired requirements in practice. Moreover, acrylonitrile is acknowledged to be a hazardous material. In U.S. Pat. No. 3,392,048 nitriles other than acrylonitrile are also mentioned as technical equivalents. These nitriles are methacrylonitrile, ethacrylonitrile, maleonitrile and fumaronitrile. The latter two are dinitriles. They are not available in industrial quantities. Moreover, fumaronitrile is acknowledged to be a hazardous material.

Similar paper coating compositions are described in German Patent 3 708 992. The binders used in the composition of this Patent are, inter alia, plastic dispersions based on styrene, 1,3-butadiene, 2-cyanoethylmethacrylate and an $\alpha,\beta$-monoethylenically unsaturated carboxylic acid. 2-Cyanoethyl methacrylate splits off acrylonitrile when hot. A need therefore continues to exist for an improved paper coating composition.

SUMMARY OF THE INVENTION

Accordingly, one object of the invention is to provide a paper coating composition which overcomes the disadvantages of known compositions and which yields coatings which have a particularly good balanced spectrum of properties. The coated paper is intended to have a good wet pick resistance, i.e., low values for wet pick, and, at the same time, good color uptake. Therefore outstanding printability is demanded.

Accordingly, this object and other objects of the present invention as hereinafter will become more readily apparent can be attained with a paper coating composition which consists essentially of an aqueous plastic dispersion as binder and conventional auxiliaries. The plastic dispersion is a polymer dispersion obtained by polymerization of $\alpha$-methyleneglutaronitrile, a $C_8$- to $C_{12}$-monovinyl-aromatic compound as a hardening component, a plasticizing component selected from the group consisting of $C_4$- to $C_6$-acyclic, conjugated diolefins and $C_4$- to $C_8$-alkyl (meth)acrylates, and a $C_3$- to $C_6$-$\alpha,\beta$-monoethylenically unsaturated carboxylic acid.

DETAILED DESCRIPTION OF THE PREFERRED EMBODIMENTS $\alpha$-Methyleneglutaronitrile is a dinitrile. It is available in industrial amounts. It is obtained by catalytic dimerization of acrylonitrile (Hydrocarbon Process, 44, No. 12 (1965), 151 to 153). Its suitability for copolymerization with ethylenically unsaturated monomers polymerizable by free radicals has been known for a long time (J. Polym. Sci., Part B, Polym. Letters, 4 (1966), 849 to 851). It is used in an amount of 0.25 to 15, preferably 0.5 to 10% by weight, based on the total monomers.

Some (or all) of the $\alpha$-methyleneglutaronitrile can be replaced by $\alpha$-methylenenitriles which are structurally related and therefore technically equivalent to $\alpha$-methyleneglutaronitrile in the present invention. The $\alpha$-methylenenitriles have the formula

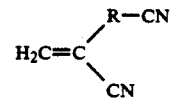

wherein R denotes a straight-chain or branched $C_1$- to $C_{10}$-hydrocarbon radical.

They can be prepared by methods known from the literature (Synthesis, 1985, 10, 969 to 970; EP 2 95 553; U.S. Pat. No. 3,494,969; FR 1 383 999; J. Chem. Soc. Perkin Trans. (1977) 1 (3), 286 to 292; SU 250 130-S). However, they are not currently available in industrial amounts.

The monovinyl-aromatic compound is used in an amount of 15 to 85, preferably 20 to 75% by weight, based on the total monomers. An example of a suitable monovinylaromatic compound is styrene.

The plasticizing component of the composition is used in an amount of 14 to 84, preferably 20 to 60% by weight, based on the total monomers. Suitable conjugated diolefins include 1,3-butadiene and isoprene. Suitable (meth)acrylates include n-butyl acrylate and 2-ethylhexyl acrylate.

The unsaturated carboxylic acid is used in an amount of 0.5 to 10, preferably 1 to 6% by weight, based on the total monomers. Suitable unsaturated carboxylic acids include (meth)acrylic acid, maleic acid (anhydride), fumaric acid, itaconic acid and crotonic acid.

The plastic dispersion may additionally be based on modifying components. Suitable modifying components are the amides of $C_3$- to $C_6$ $\alpha,\beta$-monoethylenically unsaturated carboxylic acids, such as, for example, (meth)acrylamide, N-hydroxymethyl(meth)acrylamide and the monoamides and diamides of maleic acid and fumaric acid. These modifying components are generally used in an amount of 0.25 to 5, preferably 0.5 to 3% by weight, based on the total monomers.

Other suitable modifying components include ethylenically unsaturated sulfonic acids and their salts, such as, for example, sodium vinylsulfonate, sodium (meth)allylsulfonate, 2-acrylamido-2-methylpropanesulfonic acid, potassium 3-sulfopropyl(meth)acrylate and sodium styrenesulfonate. These modifying components are generally used in an amount of 0.25 to 5% by weight, based on the total monomers.

Still other suitable modifying components are $\alpha,\beta$-monoethylenically unsaturated nitriles, such as, for example, (meth)acrylonitrile. Suitable modifying components include 2-hydroxyethyl (meth)acrylate, 2-hydroxypropyl (meth)acrylate, butane-1,4-diol monoacrylate, glycidyl methacrylate, acrolein, allyl alcohol, formylstyrene and methyl vinyl ketone.

The aqueous plastic dispersion is obtained in a manner known in principle by polymerization of the monomers in an aqueous phase as a dispersion medium in the presence of a free radical initiator, or of an initiator system consisting of a free radical initiator and a water-soluble reducing agent, and conventional polymerization auxiliaries. The polymerization can be carried out in a batch procedure or semi-continuously. In the latter case the $\alpha$-methyleneglutaronitrile can be initially introduced into the vessel or can be metered in together with the other monomers. Metering of the $\alpha$-methyleneglutaronitrile can be restricted to part of the metering time for the monomers, for example to the final third. The polymerization can be carried out stepwise so that plastic particles having different core and shell compositions are obtained. In the case of the semicontinuous polymerization, a seed latex can be initially introduced. It can be generated in situ.

The free radical initiators can be water-soluble or monomer-soluble. Suitable water-soluble initiators include peroxodisulfates and hydrogen peroxide. Suitable monomer-soluble initiators include organic peroxides and organic hydroperoxides.

The free radical initiators can be used in combination with a water-soluble reducing agent. In addition, heavy metal salts can be used as activators. Polymerization auxiliaries which may be mentioned include ionic and nonionic emulsifiers. Suitable ionic emulsifiers include alkanesulfonates, alkylbenzenesulfonates, alkyldiphenyl ether (di)sulfonates, sulfosuccinates, alkyl sulfates, alkyl polyalkoxysulfates and alkylphenolpolyalkoxysulfates. Suitable nonionic emulsifiers include alkyl ethoxylates and alkylphenol ethoxylates.

Other polymerization auxiliaries are phosphates, nitrogen-containing complex-forming agents and molecular weight regulators. Suitable regulators include, for example, dodecanethiols, thioglycolic acid esters, tetrachloromethane and tribromomethane.

Conventional auxiliaries in paper coating compositions are for example clay and carboxy methylcellulose.

Having now generally described this invention, a further understanding can be obtained by reference to certain specific examples which are provided herein for purposes of illustration only and are not intended to be limiting unless otherwise specified.

In the following examples parts (P.)is parts b weight and per cent (%) is per cent by weight, unless indicated otherwise. The comparison examples, which are outside the scope of the invention, are denoted by capital letters.

PREPARATION OF THE AQUEOUS PLASTIC DISPERSIONS

Example 1

58 parts by weight of completely desalinated water, 0.01 part by wt. of ammonium peroxodisulfate, 0.05 part by wt. of $K_3PO_4$, 0.01part by wt. of the tetrasodium salt of ethylenediaminetetraacetic acid and 0.15 part by wt. of a commercially available sodium salt of a sulfated ethoxylated nonylphenol (ethyleneoxide/nonylphenol=13/1) were added together in a pressure reactor. The contents of the reactor were heated to 85° C. 5% of a first mixture consisting of 59 parts by wt. of styrene, 35 parts by wt. of 1,3-butadiene, 1 part by wt. of α-methyleneglutaronitrile and 1 part by wt. of tert-dodecylmercaptan and also 5% of a solution of 4 parts by wt. of acrylic acid, 1 part by wt. of acrylamide and 0.74 part by wt. of the above-mentioned emulsifier in 20 parts by wt. of water (second mixture) were then added. The uniform addition of a solution of 1 part by wt. of o ammonium peroxodisulfate in 34 parts by wt. of water was then started. After 1 hour the uniform addition of the residual amounts of the first and second mixture was started. The monomer addition was complete after a further 5 hours. The initiator addition was complete after a further hour, that is to say after a total of 7 hours. The polymerization was completed in the course of further 3 hours. The resulting dispersion was separated from coarse constituents by filtration, residual monomers were removed by evaporation, the pH value was adjusted to 7.0 using sodium hydroxide solution and the dispersion was subjected to fine filtration. The dispersion prepared in this way was characterized as indicated in the Table infra.

Examples 2, 3 and A to D

Example 1 was modified in respect of the monomer composition as indicated in the Table. The resulting dispersions were characterized as indicated in the Table.

Example 4

Example 1 was repeated; however, 8% of a first mixture consisting of 42 parts by wt. of styrene, 22 parts by wt. of 1,3-butadiene and 0.6 part by wt. of tert-dodecylmercaptan as well as 5% of a solution of 4 parts by wt. of acrylic acid, 1 part by wt. of acrylamide and 0.85 part by wt. of the emulsifier indicated in Example 1, in 20 parts by wt. of water, (second mixture) were added. The addition of the initiator was then started. The uniform addition of the residual amounts of the first and second mixtures was started after 1 hour. After a further 3 hours the addition of the first mixture was complete and the uniform addition of a third mixture consisting of 18 parts by wt. of styrene, 12 parts by wt. of 1,3-butadiene, 1 part by wt. of α-methyleneglutaronitrile and 0.4 part by wt. of tert-dodecylmercaptan was started. After a further 2 hours the addition of the third mixture and the addition of the second mixture were complete. After a further hour, that is to say after a total of 7 hours, the initiator addition was complete. The subsequent procedure corresponded to Example 1. The dispersion was characterized as indicated in the Table.

Examples 5 and 6

Example 4 was modified with respect to the monomer composition as indicated in the Table, the modifications specifically relating only to the third mixture. The resulting dispersions were characterized as indicated in the Table.

Preparation of Paper Coating Compositions

Paper coating compositions (paper coating paints) were prepared rising the aqueous plastic dispersions obtained above as binders, in accordance with the following formulation:
(a) aqueous plastic dispersion containing 10 parts by wt. of solids
(b) 100 parts by wt. of clay
(c) 1 part by wt. of carboxymethylcellulose.

The solids content was adjusted to 60% using water and the pH value was adjusted to 8.5 using sodium hydroxide solution.

Wood-free base paper (70 g/m²) was coated with the coating paints obtained in this way, using a blade at a coating speed of 150 m/min. The weight applied was 15 g/m². The coated paper was sanitized using a three-roll calender at a line pressure of 50 KN/m.

The coated papers were characterized using test methods known from the literature (German Patent 3 708 992) as indicated in the Table.

In order to achieve good printability, it is necessary that the paint rejection (wet) and, at the same time, the wet picking should be as low as possible; that is to say that the percentage proportions have values as low as possible.

The results of the printing tests show that the plastic dispersions according to the invention lead to coating qualities which in respect to the dry pick resistance, corresponding to low values for dry pick, and the paint rejection (wet) are comparable to coatings which are obtained using plastic dispersions of the prior art.

In Example 3 a wet pick of 23% was achieved using 3 parts by wt. of dinitrile, whilst in Example B a wet pick of 51% was achieved using 3 parts by wt. of acrylonitrile. Thus, under comparable conditions with respect to the nitrile groups, a distinct improvement in the wet pick resistance, corresponding to a very low value for wet pick, was achieved in Example 3 according to the invention. A similar finding is obtained from suitable comparison of the other examples.

To summarize, it can be stated that an improved printability of the coated papers can be achieved using the paper coating compositions according to the invention.

TABLE

| | Preparation of the aqueous plastic dispersions and testing of the coated papers | | | | | | | | |
| | Styrene/ | | | | | | Picking | | Paint rejection |
| Example | butadiene[1] [P.] | Dinitrile[2] [P.] | Acrylonitrile [P.] | Solids [%] | $d_n$[3] [nm] | MFT[4] [°C.] | dry [cm/s] | wet [%] | wet [%] |
| --- | --- | --- | --- | --- | --- | --- | --- | --- | --- |
| 1 | 59/35 | 1 | — | 49.9 | 147 | 13 | 60 | 50 | 9 |
| 2 | 58/35 | 2 | — | 49.4 | 159 | 16 | 52 | 34 | 17 |
| 3 | 57/35 | 3 | — | 50.4 | 153 | 14 | 58 | 23 | 13 |
| A | 60/35 | — | — | 50.1 | 129 | 13 | 60 | 54 | 8 |
| B | 57/35 | — | 3 | 50.2 | 140 | 15 | 58 | 51 | 10 |
| C | 53/36 | — | 6 | 50.6 | 143 | 15 | 50 | 45 | 12 |
| D | 47.5/38.5 | — | 9 | 50.8 | 158 | 13 | 57 | 41 | 14 |
| 4 | 60/34 | 1 | — | 50.6 | 148 | 13 | 57 | 38 | 20 |
| 5 | 59/34 | 2 | — | 48.6 | 142 | 17 | 57 | 28 | 17 |
| 6 | 58/34 | 3 | — | 49.4 | 139 | 17 | 52 | 25 | 16 |

[1] In addition 4 parts by wt. of acrylic acid and 1 part by wt. of acrylamide were used in each case.
[2] Dinitrile = α-methyleneglutaronitrile
[3] Number-average particle diameter determined by electron microscopy
[4] MFT = minimum film formation temperature

What is claimed as new and desired to be secured by Letters Patent of the U.S. is:

1. A paper coating composition, consisting essentially of an aqueous plastic dispersion which is based on α-methyleneglutaronitrile, a $C_8$- to $C_{12}$-monovinylaromatic compound, a plasticizing component selected from the group consisting of $C_4$- to $C_6$ acyclic, conjugated diolefins and $C_4$- to $C_8$-alkyl (meth-)acrylates, and a $C_3$- to $C_6$ α,β-monoethylenically unsaturated carboxylic acid as binder, and conventional auxiliaries.

2. The paper coating composition according to claim 1, wherein the plastic dispersion is based on 15 to 85% by wt. of the monovinylaromatic compound, 14 to 84% by wt. of the plasticizing component, 0.5 to 10% by wt. of the unsaturated carboxylic acid and 0.25 to 15% by weight of α-methyleneglutaronitrile, in each case based on the total monomer content.

3. The paper coating composition according to claim 1, wherein the plastic dispersion is based on 20 to 75% by weight of styrene, 20 to 60% by weight of a plasticizing component selected from the group consisting of 1,3-butadiene and n-butyl acrylate, 1 to 6% by weight of an unsaturated carboxylic acid selected from the group consisting of acrylic acid, methacrylic acid and fumaric acid and 0.5 to 10% by weight of α-methyleneglutaronitrile, in each case based on the total monomer content.

4. The paper coating composition according to claim 1, wherein the α-methyleneglutaronitrile component has the formula:

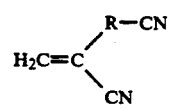

wherein R is a straight chain or branched $C_1$–$C_{10}$-hydrocarbon radical.

5. The paper coating composition according to claim 2, wherein the amount of said monovinyl aromatic compound is 20 to 75% by wt., the amount of said plasticizing component is 20 to 60% by wt., the amount of said unsaturated carboxylic acid is 1 to 6% by wt. and the amount of said α-methyleneglutaronitrile ranges from 0.5 to 10% by wt.

6. The paper coating composition according to claim 1, wherein the plastic dispersion is obtained by semicontinuous polymerization.

* * * * *